Sept. 19, 1967  W. A. MORTON ET AL  3,342,470
METHOD AND APPARATUS FOR MAKING STEEL
Filed Dec. 4, 1963  9 Sheets-Sheet 5

Fig. 5a. CONVENTIONAL PROCESS- OXYGEN FIRED

PRODUCTION 350 TONS
PRODUCTION PER MIN. 1.3 TONS

Fig. 5b. PROCESS OF PRESENT INVENTION

PRODUCTION 960 TONS
PRODUCTION PER MIN. 3.55 TONS
RATIO 2.73 X 1

Fig. 5c. HEAT CONTENT OF MATERIALS PER TON OF CHARGE

| | | | | |
|---|---|---|---|---|
| BASIC OXYGEN CONVERTER COLD (ROOM TEMP.) | 70% LIQUID PIG IRON 30% SCRAP | | 532,000 BTU 5,320 BTU | |
| | | TOTAL | 537,320 BTU | AVG. TEMP.=1680°F. |
| CONVENTIONAL OPEN HEARTH COLD (ROOM TEMP.) | 60% LIQUID PIG IRON 40% SCRAP | | 460,000 BTU 7,200 BTU | |
| | | TOTAL | 467,200 BTU | AVG. TEMP.=1450°F. |
| CONVENTIONAL OPEN HEARTH COLD (ROOM TEMP.) | 50% LIQUID PIG IRON 50% SCRAP | | 380,000 BTU 8,900 BTU | |
| | | TOTAL | 388,900 BTU | AVG. TEMP.=1210°F. |
| PROCESS OF PRESENT INVENTION PREHEATED (FROM ROOM TEMP.) | 50% LIQUID PIG IRON 50% SCRAP | | 380,000 BTU 240,000 BTU | |
| | | TOTAL | 620,000 BTU | AVG. TEMP.=1940°F. |

INVENTORS
William A. Morton &
Alfred S. Sobek
their attorneys

INVENTORS
WILLIAM A. MORTON AND
BY ALFRED S. SOBEK

ATTORNEYS

United States Patent Office 3,342,470
Patented Sept. 19, 1967

3,342,470
METHOD AND APPARATUS FOR
MAKING STEEL
William A. Morton and Alfred S. Sobek, Pittsburgh, Pa., assignors, by mesne assignments, to Sunbeam Corporation, a corporation of Illinois
Filed Dec. 4, 1963, Ser. No. 328,067
21 Claims. (Cl. 266—9)

This application is in part a continuation-in-part of our co-pending application Serial Number 246,492, filed December 21, 1962 and now abandoned.

The present invention relates to a new and improved method and apparatus for making steel, and more particularly to a new and improved method and apparatus for producing high quality steel from a combination of molten pig iron and cold scrap metal.

In the United States, at the present time, about eighty percent of the total steel production is produced in open hearth furnaces, either basic or acid with approximately ten percent being produced by the basic oxygen process and the remaining percentage being attributed to electric furnace and other types of production.

Open hearth furnaces are fired with fuel derived from an external source such as natural gas, manufactured gas, gas derived as a by-product in other steelmaking operations, and the like. The flame and heated combustion are directed onto and across the metal in the hearth to oxidize impurities in the metal. The process of heat transfer is not efficient, however, and large amounts of fuel are required in the open hearth to refine a heat. For example, three and one-half million B.t.u.'s may be required for each ton of steel in the heat, although nearly double that amount has been observed in commercial practice. The open hearth process is a relatively slow one due to the slow rate of heat transfer and refining. The time to refine a typical heat may be, for example, about ten hours. Thus in a furnace of two hundred ton capacity, the production rate is on the order of twenty tons per hour. The cost of open hearth furnaces is high. A typical installation may have a cost of sixty million dollars for an installed capacity of two million tons of steel per year. In consequence of the foregoing, the cost of refining steel in an open hearth is relatively high—often as much as $8.00 per ton, or more.

The open hearth process can, because the furnace is externally fired, be used to refine charges of pig iron and scrap in any proportions to good quality steel. It can, for example, satisfactorily refine a heat in which the charge is entirely cold scrap. Since the firing rate can readily be controlled, it can also handle a charge which is entirely of hot metal, such as in the duplex process.

In recent years commercial grades of oxygen have become available in commercial quantities and at prices low enough to make its use economically feasible. Many conventional open hearth furnaces have been fired with oxygen in place of atmospheric air. That practice has increased the firing rate, increased the operating temperatures and speeded up the refining process in some degree. A reduction in refining time of about 50% may be considered as typical. Production costs have, in consequence, also been lowered somewhat.

The basic oxygen process has come into commercial use since the development of commercially feasible oxygen producing plants. In contrast to the open hearth process, the basic oxygen process is carried out solely by the heat of exothermic reactions between impurities in the charge—notably carbon, sulfur, and silicon—and a jet of oxygen directed into the vessel. The reaction takes place in intimate contact with the charge, and the heat of the reaction is transferred directly to the charge instead of large quantities of heat passing up the stack as in an open hearth plant. A typical installation having a capacity of about two million tons per year costs less than half as much as an open hearth installation of the same capacity—generally about one-third as much. Moreover, a basic oxygen converter having a vessel capacity of two hundred tons will produce about ten times as much as a standard open hearth furnace of the same size because of the shorter production cycle. Even when an open hearth is fired with oxygen, the production rate of the basic oxygen process is greater than the open hearth process in a furnace of the same size. Since the basic oxygen process requires no external fuel and operates solely upon the heat generated by the oxidation of included impurities, the cost of a fuel gas is saved. Even though the cost of oxygen is significant, the overall cost of using the basic oxygen process may be significantly less than the cost of using the open hearth process.

In contrast to the open hearth process the basic oxygen process is limited in the charge which must be supplied to it. The charge must be predominantly hot metal in which scrap is a minor constituent. The charge must be about 70% or more hot metal, since if less is charged, the charge will not have enough heat to carry the refining process through to completion. If the charge were entirely cold scrap, the reaction would, of course, never begin. Accordingly, the basic oxygen process is one which is heavily dependent upon a supply of hot metal. It is unable to advantageously use large quantities of scrap in those countries and under those economic conditions in which scrap is plentiful and low in price.

In the operation of an open hearth furnace, the charges of cold scrap and that of molten pig iron are added progressively in the order mentioned during the heat as the melting of the metal on the hearth proceeds. Refining is accomplished with heat from the burning of fuel in an atmosphere with considerable excess air. Ordinarily 50% or more excess air is admitted to the furnace. The hearth is constructed to form a pool of metal of shallow depth in order to provide a large surface to absorb heat and oxygen from the burning fuel and gases passed over this surface. In a conventional open hearth, a number of charging doors are provided along the sides for the addition of the charge. The charging of cold scrap is a slow operation because of the length of the hearth, the number and size of doors through which the materials have been charged and the limitations of existing equipment. Throughout the charging time the doors are open for extended periods and large quantities of cold air infiltrate into the furnace, cooling it a significant amount. The heat lost in that fashion must, of course, be recovered by further firing, causing an expenditure of both fuel and time.

In a basic oxygen converter the problem of charging time and heat loss is less acute, since the vessel is much deeper and can be tilted to receive the charge which is discharged quickly by gravity through the narrow mouth of the converter. The charging time of the basic oxygen converter is a matter of three to five minutes compared with an hour to two or more hours for the multiple door open hearth.

We provide steel refining apparatus comprising a single furnace having a pair of adjacent open receptacles in juxtaposition. We preferably provide two abutting hearths placed within a single unobstructed and uncompartmented furnace. We preferably provide access door means extending for a substantial length of each hearth and charging machines whose capacity is such that the hearth can be substantially completely charged within relatively short time. We further prefer to provide means for refining metal in one of the receptacles and passing the heat resulting therefrom across a relatively cold unrefined charge contained in the other receptacle. We further provide means to direct streams of oxygen against the charges in the hearths and preferably supply a fuel with the oxygen. We prefer to provide jetting means for use upon the charge being refined and separate jetting means for use upon the as yet unrefined charge.

We preferably provide high capacity scrap charging means effective to charge substantially a complete charge of scrap within relatively short time. In our preferred embodiment, we provide tilting bin means adjacent the access door means for rapid discharge of scrap into the furnace upon tilting of the bin means. We preferably provide chute means whereby scrap is directed into the furnace through the access door means without spilling.

The invention overcomes many of the disadvantages and limitations both of the open hearth and basic oxygen processes, and provides a flexibility and economy that cannot otherwise be achieved. The process of the invention enables steel to be refined from a charge of molten pig iron and cold metal in any desired proportions. In the preferred practice, substantial quantities of each are employed. The molten charge of pig iron and scrap is blown with oxygen to refine the metal by exothermic reaction to the characteristics of steel desired. The reactions which take place or the oxidation of various impurities such as carbon, sulfur, and silicon with the oxygen at elevated temperatures. The oxygen is a commercial grade now widely used in various industrial processes and being about 98–99% pure. Nitrogen, which constitutes about 80% of atmospheric air, has been substantially eliminated. Fuel may be supplied with the oxygen from an external source where it is desired to supplement the heat developed by the reaction of oxygen with various impurities contained within the charge. The high temperature gases emitted from the molten charge as it is blown in one receptacle of a furnace are directed to and across an adjacent receptacle of the furnace containing a fresh charge of cold metal and are passed in intimate contact with the fresh charge, preheating it to a high temperature. A further charge, including the desired amount of molten pig iron, is then introduced into the receptacle with the preheated constituents. This charge is then blown with oxygen in the same manner as the charge in the first receptacle. The hot gases emitted therefrom are utilized to preheat a new charge of cold metal which has been placed in the other receptacle after the original charge was removed. Thus, the two receptacles are alternately used as the preheating receptacle and as the refining receptacle.

Additionally, since the hot gases emitted from the blowing operation contain considerable carbon monoxide, oxygen is mixed with these gases to convert the carbon monoxide to carbon dioxide. That reaction is exothermic and develops substantial additional heat for preheating the cold charge. Thus the new and improved apparatus of the present invention includes a furnace having two adjacent receptacles, one for containing a charge of metal as it is blown, and one for containing a fresh charge of cold metal for preheating. Means are provided in the furnace for introducing and removing the charges from the receptacles, and oxygen lance means are provided for alternately blowing the charges in the receptacles in order to refine them into steel. Additional air or oxygen lance means are provided between and above the adjacent receptacles for alternately directing the hot gases emitted from the charge being blown into intimate contact with the cold charge in the adjacent receptacle in order to preheat it to a high temperature and to provide additional heat by oxidizing the carbon monoxide in the emitted hot gases into carbon dioxide. The additional lance positioned over the scrap charge will be positioned at a substantial level above the scrap to deliver oxygen to the carbon monoxide in the waste gases and direct the resultant products of combustion downwardly into the center of the scrap receptacle. There is also provided new and improved apparatus for rapidly charging the furnace with scrap or other cold metal so that the charge enters the furnace in such a manner that damage to the refractory linings of the receptacles is held to a minimum.

In the foregoing manner steel may be produced from scrap and pig iron in various percentages not heretofore obtainable without a supply of fuel from an external source. The invention may be carried out in a furnace of well known design such as the open hearth type. Existing open hearth installations may be reconstructed to practice the invention at substantial cost savings. The heat from the exothermic reactions in one hearth of the furnace is used to preheat the charge in the other hearth making it possible to utilize higher percentages of scap than heretofore without use of external fuels. Even where use of external fuels is desired or necessary, the amount required is reduced. The preheating reduces the time required to refine the charge to a finished state and makes possible cheaper and faster production from the equipment. The invention permits quick-easy charging of metal into hearths of such depth that the charging process is a facile one which may be carried out quickly and expeditiously in a small fraction of the time previously considered necessary in furnaces of the type provided.

Other details, objects, and advantages of our invention will become more apparent as the following description of certain present preferred embodiments thereof proceeds.

In the accompanying drawings, we have illustrated certain present preferred embodiments of our invention in which:

FIGURE 6 is an enlarged view of a portion of FIGURE 1 illustrating the charging apparatus of the present invention;

Figure 1:
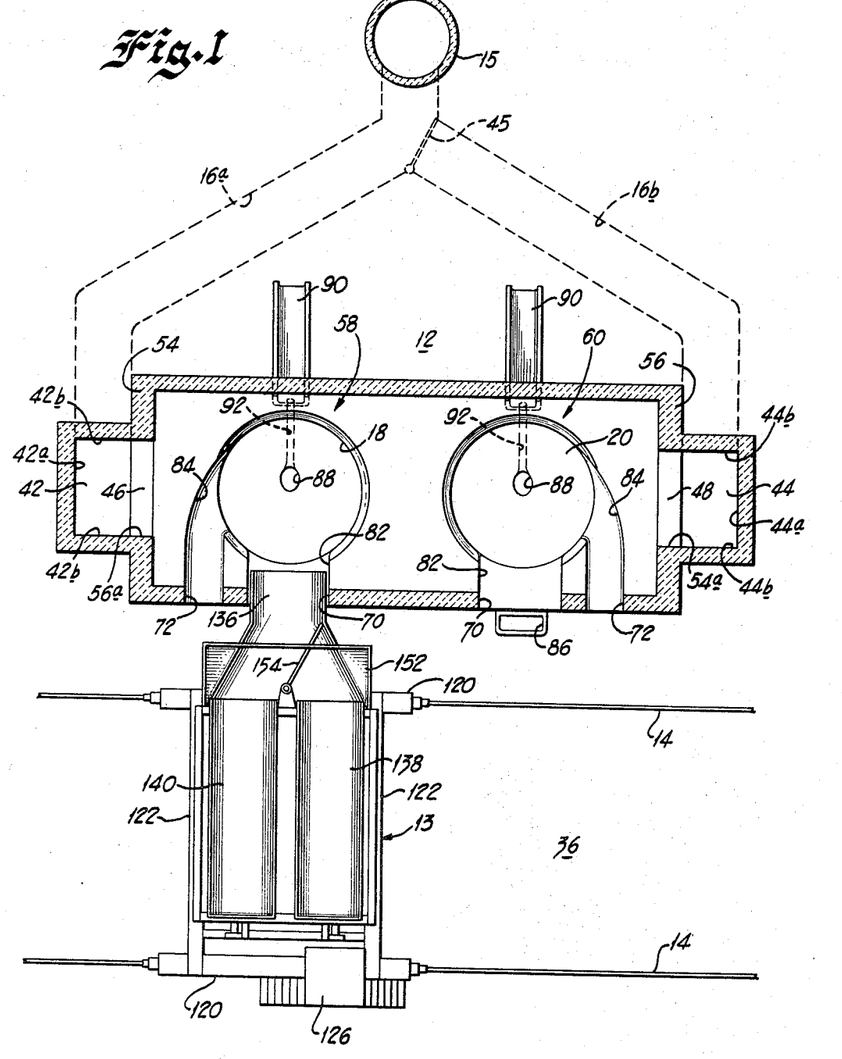
FIGURE 1 is a schematic top plan view partly in section and partly in phantom, of one embodiment of a furnace and attendant apparatus for producing steel constructed in accordance with the features of the present invention shown with the apparatus functioning with the right hand receptacle being used to refine steel while the left hand receptacle is used to preheat scrap.

Referring now to the drawings, there is illustrated in FIGURE 1, apparatus for the production of steel constructed in accordance with the features of the present invention which include a furnace 12 and charging system 13. The latter is movably mounted on rails 14 which extend for some distance along the furnace 12 in order that the charging system can be loaded with the proper amounts of the various ingredients which are stockpiled elsewhere and also so that the charging system can be used to charge each of the portions of the dual open hearth furnace of the present invention. The ends of the furnace 12 are connected to a suitable stack 15 as by passageway sections 16a and 16b, shown in phantom, which conventionally might be located underground.

Figure 2:
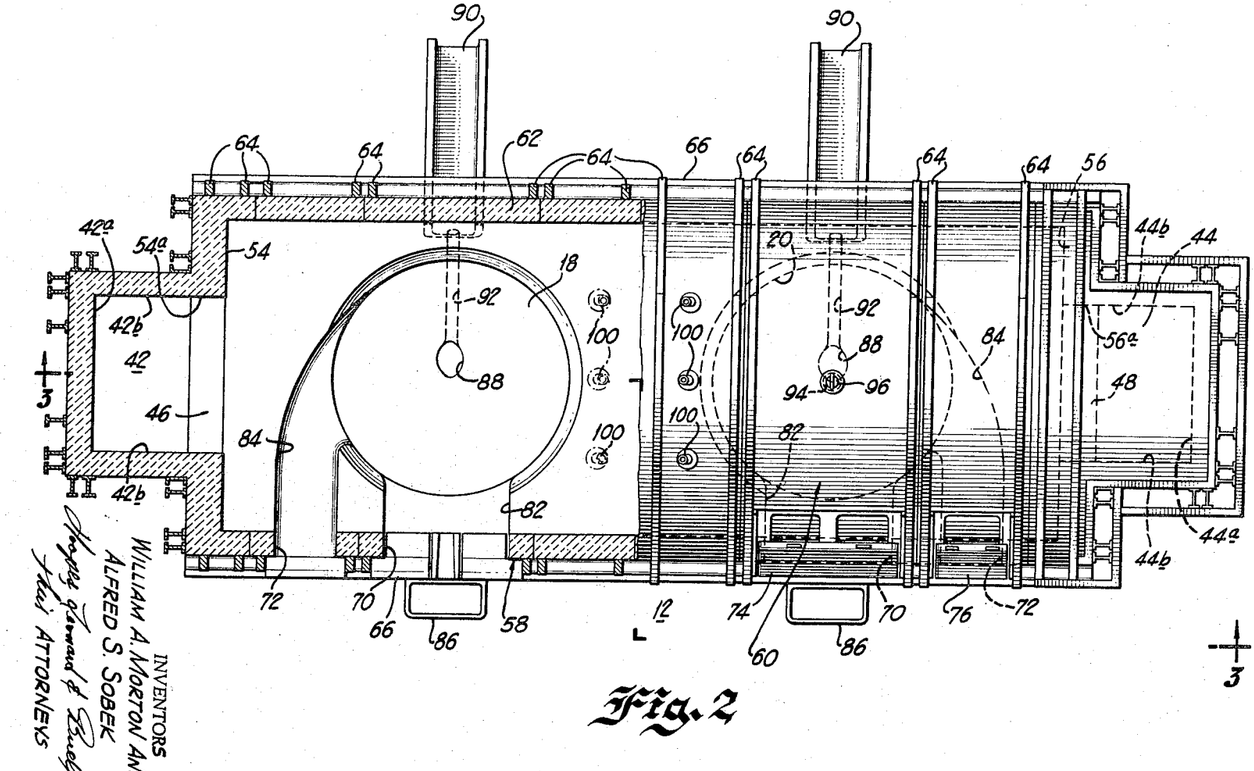
FIGURE 2 is an enlarged top plan view, partly in section, of a portion of FIGURE 1 showing the new and improved furnace embodying certain features of the present invention.
Figure 3:
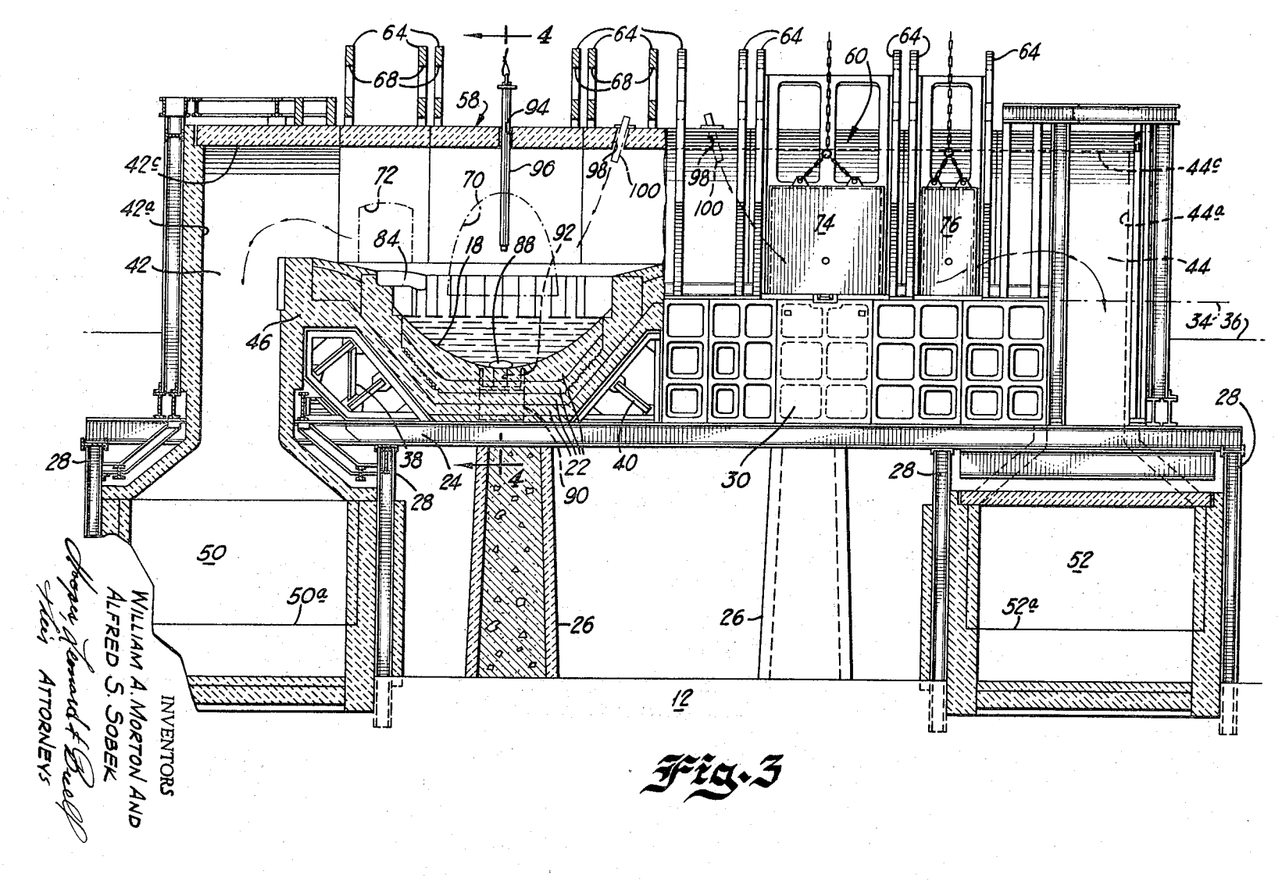
FIGURE 3 is a side elevational view of the furnace of FIGURE 2, partly in section, taken substantially along the line 3—3 of FIGURE 2, and assuming that FIGURE 2 shows the complete structure and showing the location of certain parts in phantom.
Figure 4:
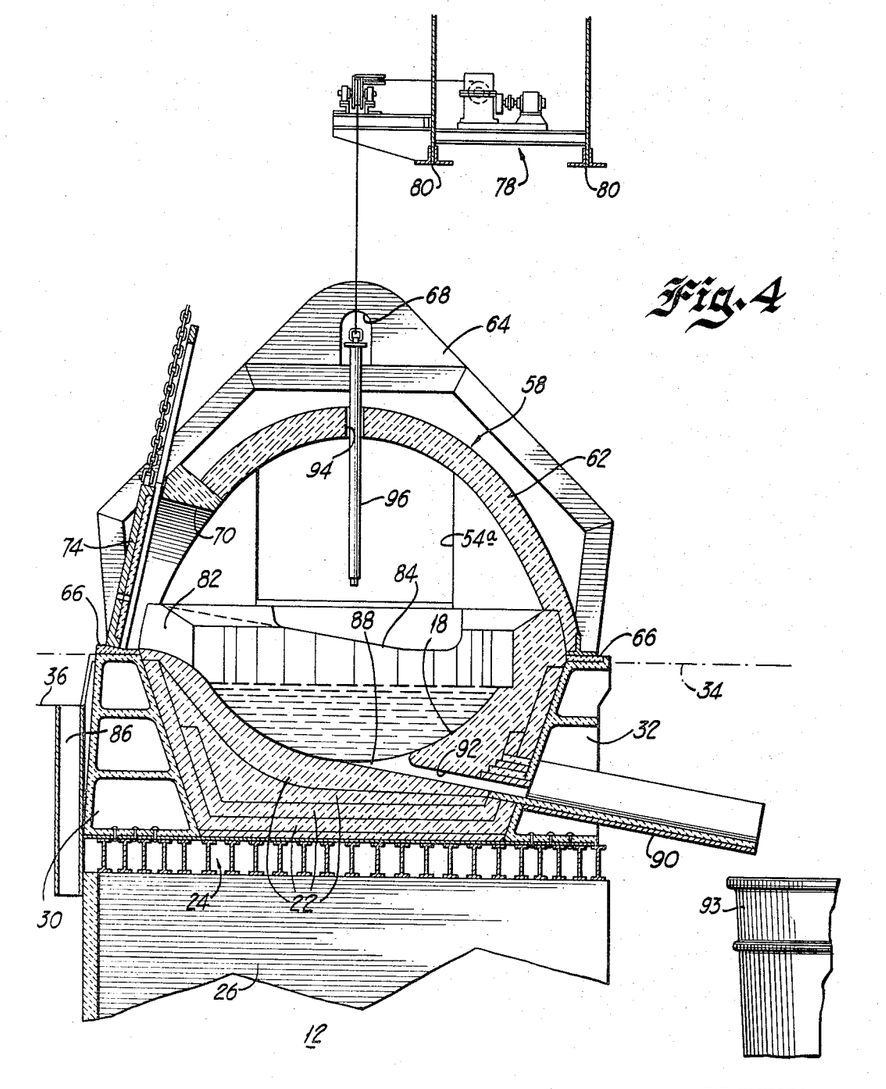
FIGURE 4 is a sectional view taken substantially on line 4—4 of FIGURE 3 assuming that FIGURE 3 shows the complete structure.

The furnace 12 is illustrated in detail in FIGURES 2, 3 and 4 of the drawings and includes a supporting section which might be designated broadly as a hearth having a pair of adjacent charge receiving receptacles 18 and 20. Receptacles 18 and 20 may themselves properly be referred to as hearths in which separate refining actions are carried out. The hearth and receptacles therein are built of several layers of refractory material 22 in the usual manner and the structure is carried by a steel frame floor 24 supported in the center by posts 26 and at the ends by a plurality of steel columns 28.

In order to provide for the proper depth of the receptacles 18 and 20, the furnace is provided with structural side walls 30 and 32 which run the length of the furnace on both sides of the receptacles. The side walls 30 and 32 terminate along a horizontal plane designated as 34 (FIGURES 3 and 4) which for a particular embodiment was approximately three feet above the level of the charging floor designated as 36 adjacent the charging side of the furnace. Internal end structures 38 (FIGURE 3) and a central structure 40 supported from the frame 24 are also provided to give support for the walls of the receptacles 18 and 20.

The receptacles 18 and 20 are somewhat deeper than is the case with the normal open hearth furnace since oxygen is used for blowing the charges therein and a large surface area of the molten charge is not required. In a specific embodiment, the maximum depth of these receptacles from the surface of the molten charge was in excess of four feet as compared with a thirty inch depth customarily used in open hearth installations. This added depth increases the capacity of the furnace 12 to hold approximately the same volume of charge as a converted open hearth installation having a larger area but shallower depth.

At both ends of the furnace 12 there are provided the chambers 42 and 44 for directing the flow of gases over the receptacles in the desired direction. This is accomplished by suitable damper means 45 (FIGURE 1) controlling which passageway 16a or 16b is effectively connected to the stack 15. The chambers 42 and 44 are in communication with the space above the receptacles 18 and 20 and there are provided vertically disposed walls 46 and 48 (FIGURES 2 and 3) which terminate level with the top of the receptacles. Directly below the chambers 42 and 44 there are conventional slag pits 50 and 52 (FIGURE 3) which are provided with refractory lined walls and are in communication with the flue system 16a and 16b of the furnace 12 through outlets 50a and 52a in the side walls of the pits. Slag or other material flowing over the end walls 46 and 48 will drop directly into the slag pits 50 and 52 while gases flowing through the chambers 42 and 44 will pass through the pits and outlets 50a and 52a therein into or from the flue system of the furnace as the case may be.

The chambers 42 and 44 are provided with refractory lined end walls 42a and 44a, side walls 42b and 44b and ceiling walls 42c and 44c, respectively. The ceiling walls 42c and 44c extend inwardly past the end walls 46 and 48 of the hearth and conform generally to the shape of the ceiling walls over the hearth itself. The side walls 42b and 44b intersect end walls 54 and 56 of the furnace (FIGURE 2) which are provided with openings 54a and 56a, respectively, in order that the gases may pass to the chamber 42 or 44 after passing over the receptacle 18 or 20, respectively.

A furnace roof confines the heat from the furnace and provides an enclosure channeling the gases evolved by the reactions in one hearth across the cold charge in the other hearth. The roof comprises a plurality of removable cover members 58 and 60 which are positioned adjacent each other to overlie the receptacles 18 and 20, respectively. The cover members 58 and 60 are identical and are each provided with an arched ceiling 62 (FIGURE 4) constructed of refractory material supported by a plurality of steel frames 64. The cover members are provided with steel bar flanges 66 attached thereto which rest and are attached to the top surfaces of the side wall structures 30 and 32 when the covers are in place. Each of the frames 64 is provided with a vertical slot 68 through which the lift bar of a crane or other device can be inserted in order that the cover member can be readily lifted bodily from the furnace or replaced thereon.

So that each receptacle 18 and 20 may be charged, each cover member 58 and 60 is provided with a large opening 70 through which bulky scrap metal can be supplied to the receptacle 18 or 20 and a smaller opening 72 for charging the receptacles with molten metal. These openings, shown in phantom in FIGURE 3, are positioned to lie adjacent the charging floor 36 in order that charging materials can be fed through openings 70 from the charging system described in detail hereinafter, and molten metal from metal containing ladles can be supplied through openings 72.

In order to maintain the high temperatures of the furnace and to reduce heat loss, the openings 70 are provided with upwardly slidable charging doors 74, which may be water cooled, and the openings 72 are provided with similar smaller doors 76 (FIGURE 3). These doors, which may be of conventional design, are supported for sliding movement by door frame structures (not shown) which, if desired, may also be water cooled. The furnace 12 is provided with channels 82 (FIGURES 1, 2, and 4), one for each opening 70, which interconnect the openings 70 and their respective receptacles 18 and 20. Each of the receptacles 18 and 20 is provided with a molten metal charging chute 84 which communicates with its respective opening 72 in order that the molten metal charge which is supplied through the charging door 76 will flow into the desired receptacle 18 or 20 as the case may be. These charging chutes 84 cause the molten metal to enter the receptacles 18 and 20 in a tangential manner.

There is provided exteriorly of the wall 30 of the hearth 16 adjacent each opening 70, a front flush chute 86 which receives the molten slag which must be removed from the furnace to carry away fluxed impurities before the molten heat is tapped from the hearth.

So that finished steel can be removed from the receptacles 18 and 20 in the usual manner, each of the receptacles is provided with centrally located bottom tap holes 88 which communicate with discharge chutes 90 through tapping passages 92. The discharge chutes or spouts lead to a conventional pouring ladle 93.

In accordance with the present invention, and in order to provide for the refinement of the charge in the receptacles 18 and 20, each cover member 58 and 60 is provided with a central aperture 94 in the roof thereof through which an oxygen-fuel lance 96 can be extended to blow the charge in the receptacle. The oxygen-fuel lance is supported from the lance hoist 78 and is alternately lifted and lowered through the cover member. The two lances provided over the adjacent receptacles are used alternately to blow the charges in the receptacles 18 and 20 during operation of the furnace. Each lance has an individual hoist such as that shown in FIGURE 4. A lifting winch 78 is mounted on rails 80 and is operable to raise and lower lance 96 which is hung from the end of a cable wound on the drum of the winch. Each lance 96 may optionally be supplied only with oxygen or with a fuel-oxygen mixture as operating conditions require. Both lances may be employed simultaneously—one to blow the charge being refined, and the other to preheat the charge in the other hearth or receptacle, supplementing the heat generated by the refining process in the first hearth or receptacle.

There is also provided in each cover member a plurality of angularly disposed openings 98 through which extend a plurality of removably mounted oxygen or air lances 100 (FIGURES 2 and 3). Because of their angularly disposed arrangement, the air supplied thereto can be directed in either direction depending on the particular receptacle 18 or 20 where preheating is taking place. The auxiliary lances 100 are at an angle to direct the air blast toward the center of the receptacle 18 or 20 in which a charge is being preheated. The air lances 100, one being shown in dotted lines in FIGURE 3 (associated with cover member 58), are used when the receptacle 18 is used for preheating. When the receptacle 20 is being used for preheating, the lances associated with cover member 60 are employed.

In the operation of the furnace 12, a molten charge generally comprising a mixture of scrap metal and pig iron is disposed in one of the receptacles such as 18 and this charge is ready for refinement to steel. At the same time a charge of cold scrap is placed in the adjacent receptacle 20. The oxygen lance 96 is then lowered into place over the receptacle 18 and the molten charge therein is blown with this oxygen lance resulting in the burning out of the impurities. Due to the chemical reactions involved, large quantities of heat are produced and there is frequently no necessity as in the conventional open hearth furnace to burn fuel for producing heat. The blasts of air or oxygen from auxiliary lances 100 combine with the gases emitted from the charge in receptacle 18 being blown. Since these emitted gases contain large amounts of carbon monoxide, oxygen from the air lances 100 and the adjacent lance 96 intermixing therewith the carbon monoxide causes much of the latter to be further oxidized to carbon dioxide thus producing additional heat by this exothermic action. These hot gases are directed by the superatmosphere pressure employed into intimate contact with the cold scrap metal in receptacle 20 causing it to be preheated up to temperatures of 1500° F. or higher, depending upon the percentage of scrap in the steel mix and the physical form of the scrap which may limit the effectiveness of the heating. It should be noted that the direction of the lances burning the carbon monoxide is such that the mixture of the resultant gases and those emitted from the receptacle 18 is directed downwardly toward the center of receptacle 20 to provide intimate contact therewith to preheat the charge of scrap metal placed therein.

By the time the blowing process is completed in the receptacle 18, the cold scrap in the receptacle 20 has been heated to about 1500° F. by extraction of heat from the gases which would otherwise pass on out through the chamber 44 and pit 52 to the flue system comprising passageway 16b and stack 15. The tap hole 88 in the receptacle 18 is then opened and the refined steel therein passes through the passage 92 and spout 90 to the pouring ladle 93.

The oxygen lance 96 is then retracted through the cover member 58 during the subsequent charging operation. The oxygen lance 96 associated with cover member 58 is lowered for use therein. A molten pig iron charge is then introduced into the receptacle 20 containing the preheated scrap through opening 72 in the cover member 60 normally closed by charging door 76. This pig iron flows through the charging chute 84 into receptacle 20 mixing with the preheated scrap contained therein.

While this is going on, receptacle 18 is cleaned and the tap hole 88 therein is plugged in preparation for receiving a charge of cold scrap iron which is placed therein from the charging system 13 through the opening 70 in the cover member 58 controlled by door 72. The molten charge in the receptacle 20 is then blown with oxygen from the associated lance 96 in the same manner as described above in connection with the charge in receptacle 18. Gases emitted from this blowing are further oxidized by the air from the auxiliary lances 100 and the mixture is directed by these lances into intimate contact with the cold scrap charge in receptacle 18 causing it to be preheated as before described. During this operation, the flow through the furnace is reversed with the gases leaving through the chamber 42 and pit 50 into the flue system comprising passageway 16a and stack 15. Thus, the dual receptacles are alternately used to refine the molten charge to steel and to preheat the cold scrap.

Figure 5:
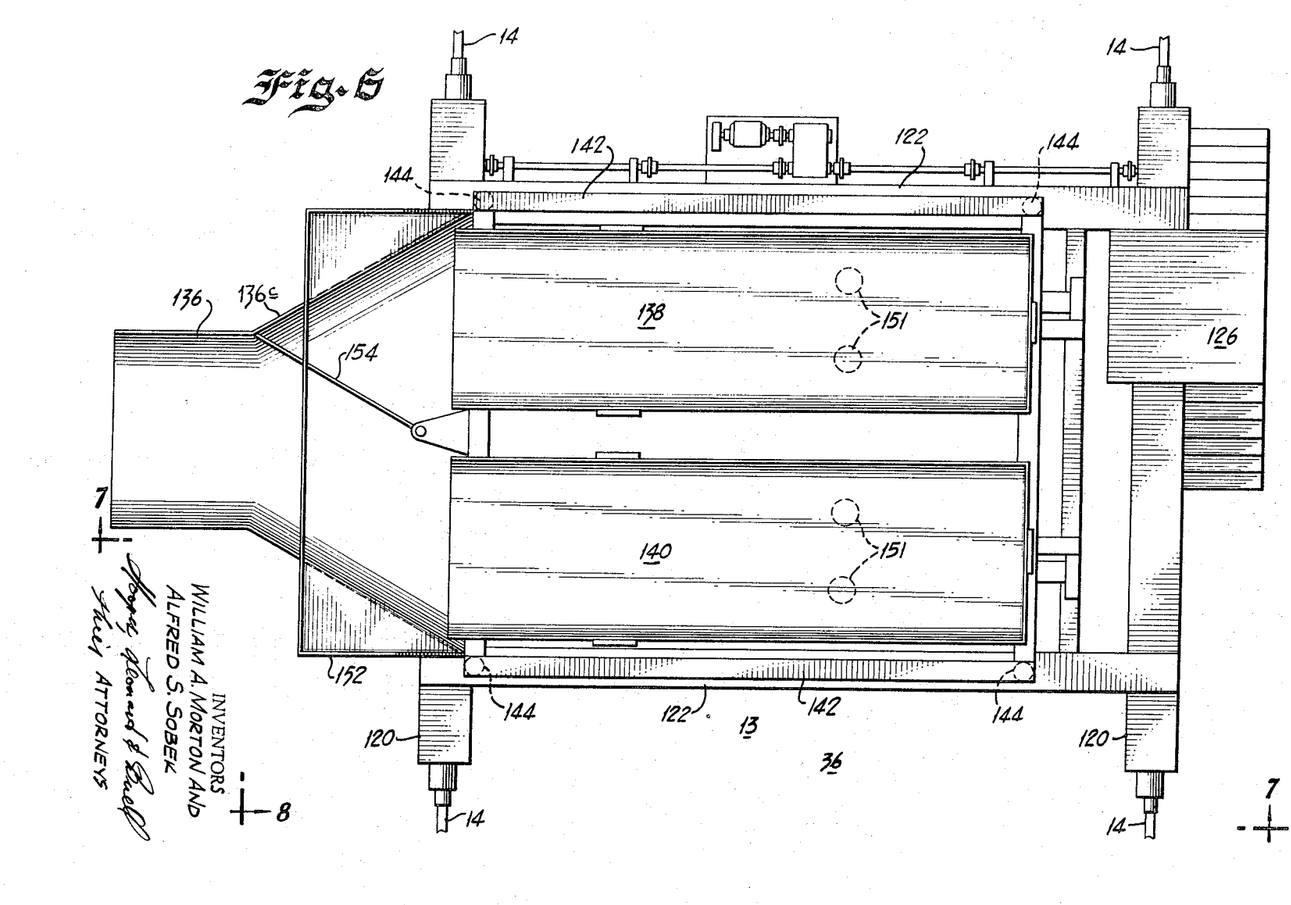
FIGURES 5a, 5b and 5c are somewhat graphical representations to aid in understanding the present invention.
Figure 5A:
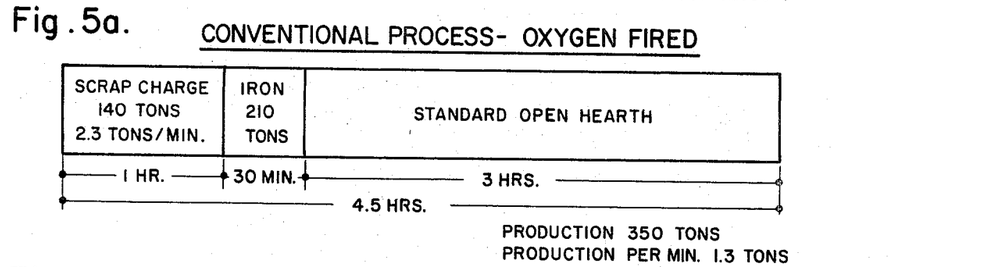
Figure 5B:
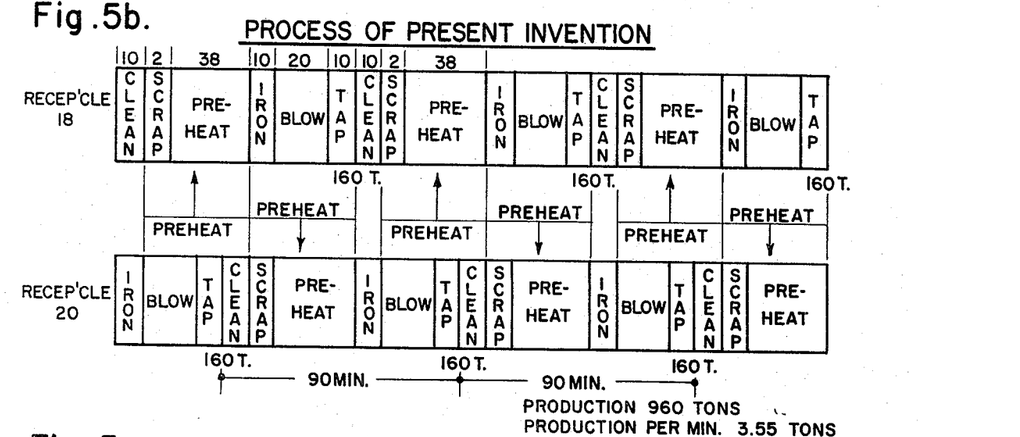
Figure 5C:
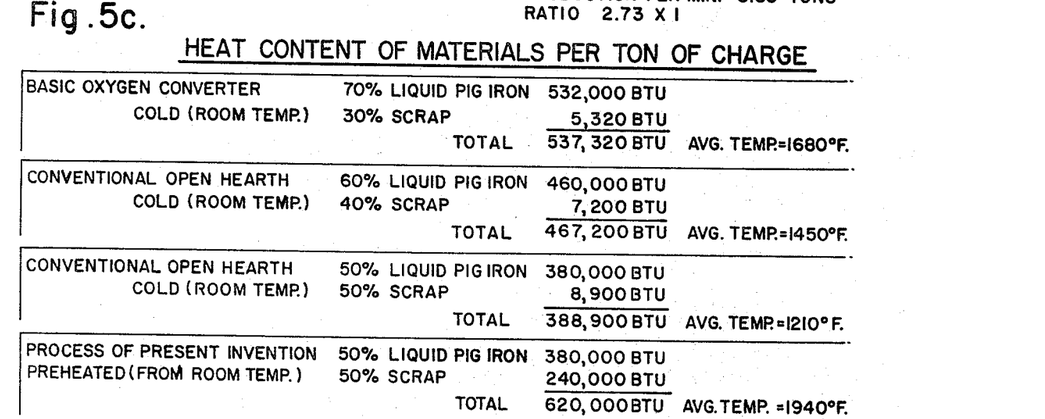

Referring now to the graphical illustrations of FIGURES 5a, 5b and 5c, FIGURE 5a illustrates the operating cycle of a typical standard open hearth furnace having a hearth capacity of three hundred fifty tons and fired with oxygen. A scrap charge of one hundred forty tons comprising choice heavy materials may be added at the rate of approximately two and three-tenths tons per minute. The pig iron charge of two hundred ten tons is added at the rate of seven tons per minute. This charge comprising forty percent scrap and sixty percent molten pig iron is heated in an extremely well organized operation for about three hours giving a total production of three hundred tons or approximately one and three-tenths tons per minute.

FIGURE 5b illustrates the process carried out in the furnace of the present invention of approximately the same physical size having receptacles 18 and 20, each having a capacity of one hundred sixty tons. The time cycle in each receptacle takes ninety minutes with the first two minutes utilized for charging with cold scrap. The cold charge is then preheated for about thirty-eight minutes while the charge in the other receptacle is being blown. Next eighty tons of molten pig iron are introduced at the rate of eight tons per minute for eight minutes. The charge of preheated scrap and molten pig iron is then blown with oxygen for twenty minutes and tapped after the blowing, allowing ten minutes for removal of the finished steel and another ten minutes for cleaning and plugging the tap in preparation for the next charge. The cycles in the receptacles are staggered timewise in respect to one another so that the blowing operation in one takes place during the first portion of the scrap charging cycle of the other, thus utilizing the heat developed during the blow for preheating the charge. Damper 45 is operated, of course, at the end of each cycle so that the hot gas evolved in the refining is forced to leave the furnace at the most remote of chambers 42 and 44.

Thus, it can be seen that the present invention provides for a production rate of nine hundred sixty tons during the same interval during which the conventional open hearth, fired with oxygen, produced only three hundred fifty tons or a ratio of approximately two and seventy-three hundredths to one for the same size installation. If the same furnace were not oxygen fired, a time of ten hours per cycle could reasonably be expected. A 200 ton basic oxygen converter on the other hand will have about one cycle per hour.

FIGURE 5c is a representation comparing heat content of materials per ton of charge in the various present day processes of refining steel and also the dual receptacle furnace of the present invention. This comparision shows the great advantage of the present invention over the old processes in both temperatures attained and the percentage of the charge required to be liquid pig iron.

The use of removable covers 58 and 60 over the receptacles 18 and 20 greatly reduces the shutdown time required for refractory repairs as compared with the conventional open hearth furnace. In conventional open hearth furnaces the top of the enclosure can only stand a limited number of heats before it is necessary to shut down the furnace to repair and rebuild the enclosure. This is not a limiting factor in the present invention, however, because of the removable cover members which might also be water cooled. Moreover, repairs on the cover members are easier since the member is removed from the hearth for easy access and a long waiting period for cooling before work is begun is not a limiting factor since five or six cover members can be provided for each installation with repaired ones always ready for use.

An important feature of the present invention resides in the fact that existing open hearth installations can readily by converted to the dual receptacle furnace of the present invention with a relatively low investment. This eliminates the necessity of abandoning existing facilities because high production and low operating costs can be obtained with the process and apparatus of the present invention. The conversion consists primarily in changing the hearth to provide two receptacles 18 and 20 instead of one, and, of course, making these receptacles much deeper than the depth of the previous open hearth receptacles. These two receptacles of a specific comparable total capacity can be provided in the same or less space as far as surface area is concerned. Of course, the roof structure must be changed and fast charging means provided to achieve the results made possible by this method.

Moreover, since the basic oxygen converter is limited to a maximum charge of thirty percent cold scrap, the process of the present invention shows a decided advantage in being able to utilize up to approximately a fifty percent charge of cold scrap by preheating it. Further the preheating feature of the present invention reduces the cost per ton of steel below that of steel produced either by the open hearth or basic oxygen process by using an available fuel now being wasted by the steel industry.

Figure 7:
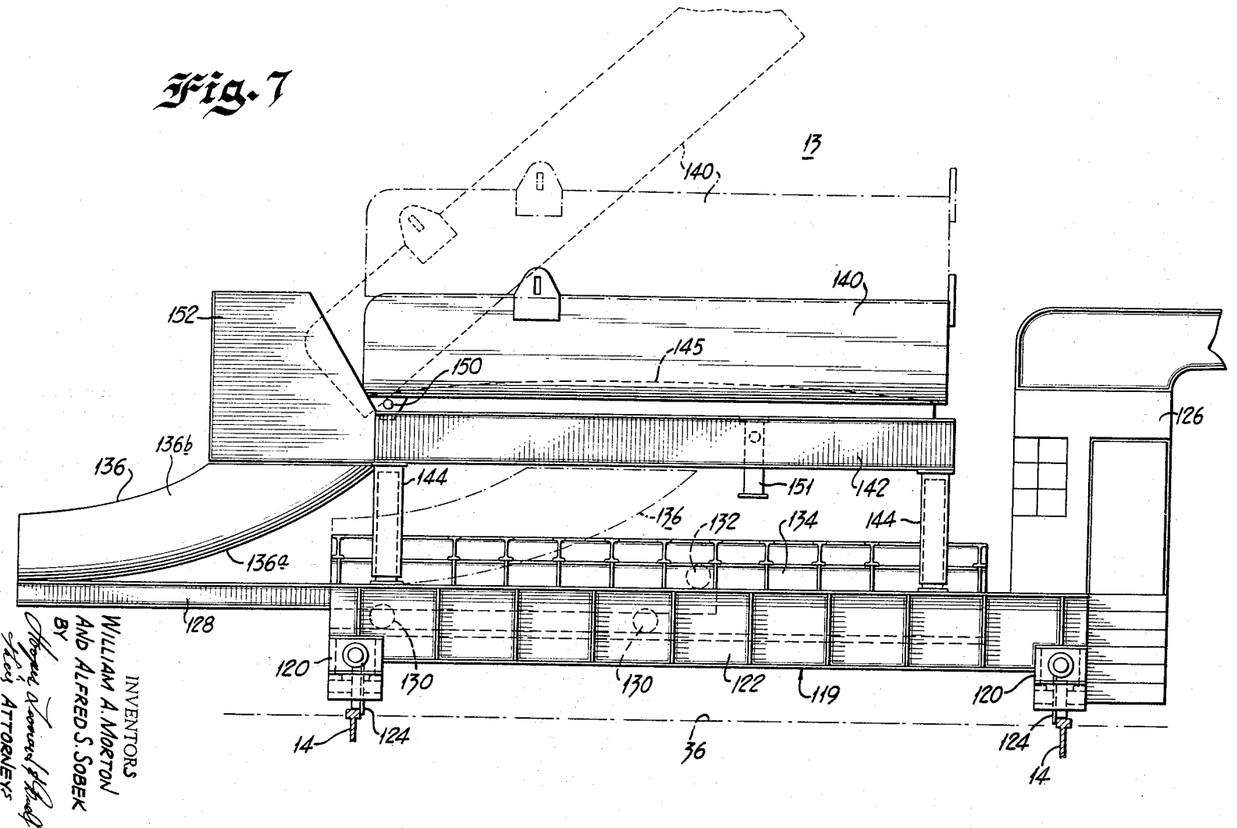
FIGURE 7 is a side elevational view of the apparatus of FIGURE 6 taken substantially along line 7—7 of FIGURE 6.
Figure 8:
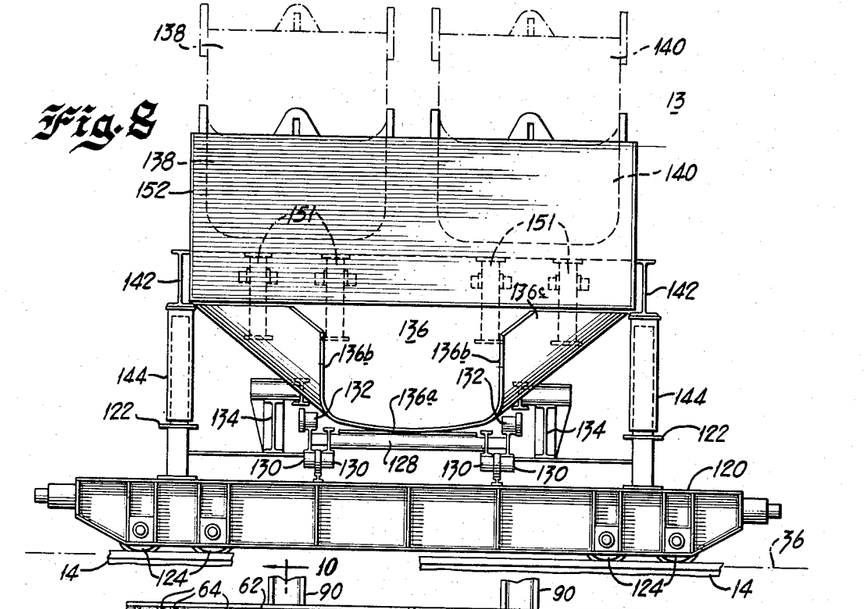
FIGURE 8 is an end elevational view of the apparatus of FIGURE 6 taken substantially along line 8—8 of FIGURE 6.

From the above description, it is apparent that the charging system 13 for the furnace 12 of the present invention must be capable of readily alternately charging both receptacles 18 and 20 without delay. In FIGURES 6, 7 and 8, one charging apparatus 13 of the present invention is illustrated in detail, which apparatus is at present considered the preferred embodiment because it can readily be applied to existing open hearth installations fitting within the existing structures customarily involved. This charging system is designed to be self-propelled along the rails 14 (FIGURE 1) provided on the charging floor 36 in order to receive boxes of scrap at a loading position of the desired kind which is stockpiled and charged into the removable boxes elsewhere.

The charging system includes an undercarriage 119 comprising a pair of parallel side undercarriage members 120 and transverse undercarriage members 122. This undercarriage is supported on flanged wheels 124 which roll along the rails 14 thereby moving the charging apparatus 13 supported thereon. The wheels 124 are driven by suitable drive means (not shown) which are controlled from a control house 126 (FIGURE 6) supported on the underscarriage 119 to move therewith. The undercarriage 119 provides a framework for supporting a slidably mounted chute carriage 128 shown by solid lines in FIGURE 7 in its charging position and by dotted lines in its retracted position. The chute carriage is supported on lower rollers 130 and upper rollers 132, the latter being mounted on structural members 134 (FIGURE 8) running parallel with the members 120.

For the purpose of charging the receptacles 18 and 20, there is provided a chute 136 having a gently sloping bottom 136a (FIGURE 7) and side walls 136b (FIGURE 8) joined thereto. The chute 136 is generally U-shaped in transverse cross-section as shown in FIGURE 8 with the bottom 136a being slightly concave and curving into rounded corners joining the side walls 136b in order that scrap metal in the chute 136 will easily flow therethrough with a relatively uniform flow without collecting in the corners and without moving in batches. The side walls 136b are flared widely at the top away from the chute exit as indicated at 136c in order to receive without spillage a charge of scrap metal from either one of two elongated removable tiltable scrap boxes 138 and 140. The chute 136 is shown in the extended position by solid lines (FIGURE 7) and in the retracted position by dotted lines.

In accordance with the present invention, the scrap boxes 138 and 140 are supported on a framework 142 carried by vertical lift hydraulic corner supports 144 which in turn are supported from the undercarriage 119. The hydraulic corner supports 144 permit the chute end of the scrap boxes 138 and 140 to have a variable height, thus permitting proper positioning and/or layering of the scrap as it is deposited in the receptacle 18 or 20. As illustrated, the scrap boxes are generally U-shaped in transverse cross section and are convexed longitudinally as indicated at 145 (FIGURE 7) and are open at their forward ends so that scrap metal loaded therein will slide out into the chute 136 when the boxes are tilted. The angle of repose changes progressively as the boxes are tilted thereby causing the scrap to flow in increments rather than enmasse. The forward ends of the scrap boxes are pivotally mounted on an axle 150 or the like in order that the rear of the boxes may be elevated by suitable means such as the hydraulic lift means 151 illustrated, thereby to feed the material from the box 138 or 140 progressively into the chute at the desired rate and, consequently, into the furnace at the desired rate. In FIGURE 7, a tilted position of the scrap box 140 is shown in dotted lines. Also FIGURE 7 shows in solid and dotted lines the lowermost and uppermost horizontal positions of the scrap box 140 as controlled by hydraulic means 144.

In order to direct the scrap metal from either scrap box 138 or 140 into the chute 136, a feed hopper or guide chute 152 is provided at the forward end of the boxes. This hopper or guide chute is supported from the frame 142 and is provided with a free moving swivel gate 154. This gate 154 automatically moves to open the scrap passageway independently of which scrap box 138 or 140 is being emptied and it directs the flow of scrap from the desired box into the scrap chute 136. The hydraulic lifts 151 which selectively tilt the box 138 or 140 to the desired tilt angle for providing the proper rate of flow of the scrap and by virtue of the vertical lift supports 144 the desired height of the discharge end of the chute relative to receptacles 18 and 20 is also controlled.

In operation the charging apparatus 12 is movable along the rails 14 and desired types and amounts from various supplies of scrap are loaded in the boxes for making up each scrap metal charge for the furnace. The system is then moved into position for charging the furnace as shown in FIGURE 1 and the door 74 of the furnace adjacent either the receptacle 18 or 20 is opened. The charge chute 130 is then extended through the opening 70 in the furnace and either of the scrap boxes 138 or 140 is lifted allowing the scrap therein to slide out progressively through the hopper 152 into the chute 136 and then the furnace from a desired height and at a desired rate.

By adjusting the amount of tilt of the scrap boxes 138 or 140 as they are progressively lifted by the lifting means 151, the proper charging rate into the furnace can be easily controlled. This flexibility of control is desirable since some charges might not flow as easily as others and the rate of flow is somewhat dependent on the amount of head of scrap material left in the box at any given instant and because of the shape of the floor of boxes 138 and 140 it is necessary to increase the tilt angle as the scrap moves out of the scrap box. The rounded corners of the scrap boxes and charging chute eliminate or reduce the tendency of the scrap to hang up and it should be noted that by providing a charging chute having very little elevation at its exit end, which is adjustable, and varying the angle of tilt of the scrap boxes during charging, the ballistic problem of the cold scrap striking or gouging the walls of the receptacle 18 or 20 is eliminated or greatly reduced. It should also be noted that the horizontal section of the scrap chutes as it leaves the boxes must never be decreased or the scrap will jam. On the other hand, by causing the scrap to drop slightly to the chute, the cross section of the *scrap* is automatically reduced as is the friction and the movement is thus accelerated.

Figure 9:
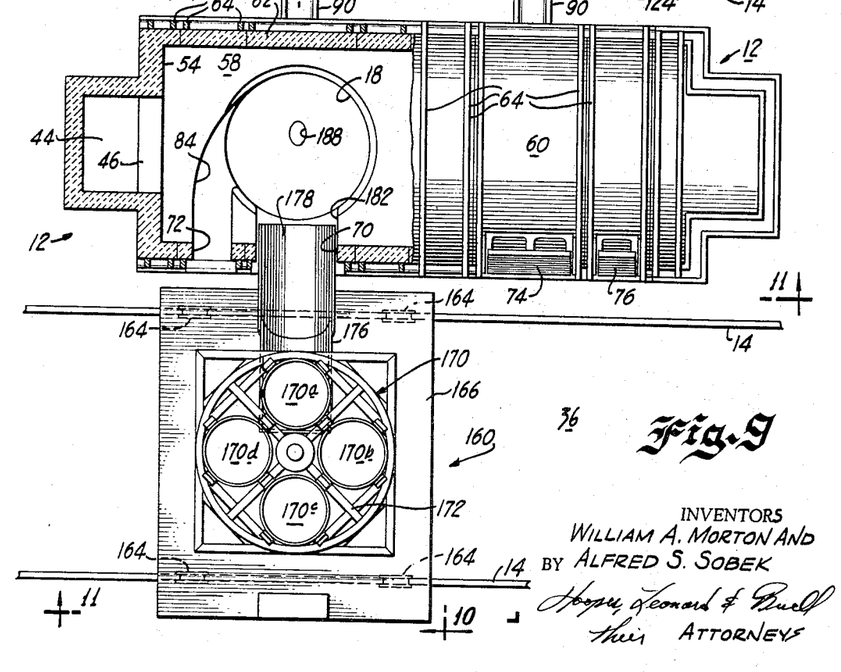
FIGURE 9 is a top plan view, partly in section, similar to FIGURE 1 schematically illustrating the furnace of the present invention utilizing another embodiment of a charging apparatus constructed in accordance with the present invention.
Figure 10:
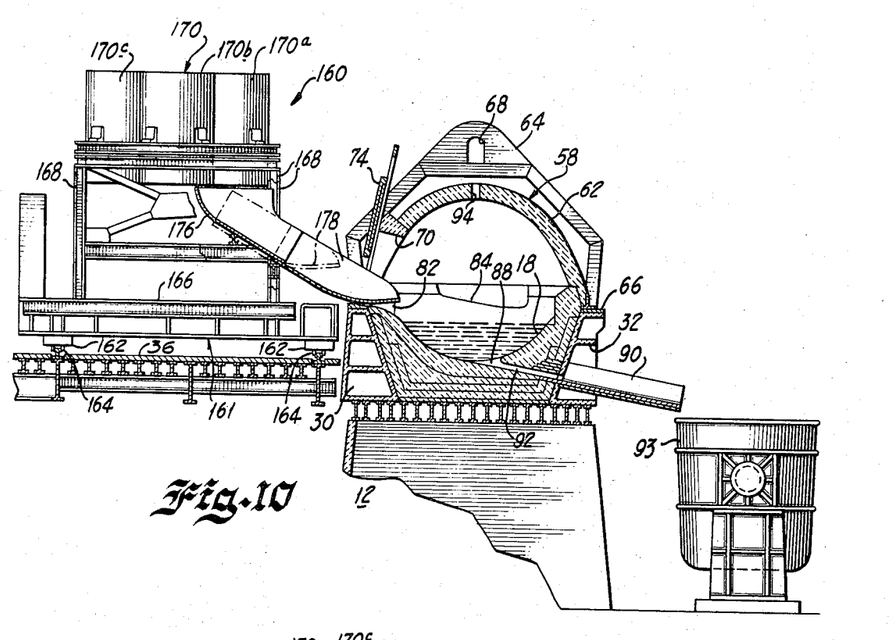
FIGURE 10 is a sectional view of the charging apparatus taken substantially along line 10—10 of FIGURE 9 assuming that FIGURE 9 shows the complete structure.
Figure 11:
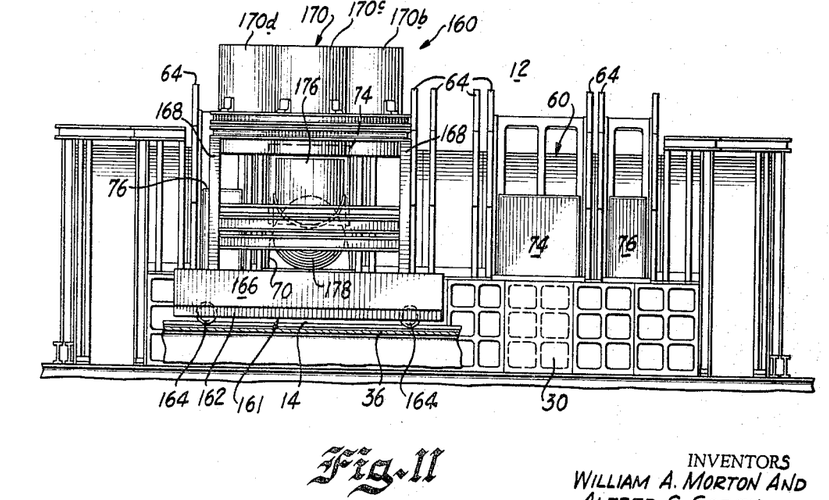
FIGURE 11 is a side sectional view taken along line 11—11 of FIGURE 9.

In FIGURES 9, 10 and 11 there is illustrated another embodiment of a charging apparatus readily useable with the furnace 12 of the present invention. This apparatus which is generally designated by the reference number 160 is adapted to move along the rails 14 on the charging floor 36 for charging the dual open hearth furnace 12. The corresponding parts of the furnace in FIGURES 9, 10 and 11 are designated by the same reference numerals as in the preceding embodiments.

The charging apparatus 160 is provided with an undercarriage 161 comprising a pair of longitudinal undercarriage side members 162 having rollers 164 thereon which roll along the rails 14. The side members 162 form a structural part of a support platform 166 on which the various parts of the charging system are supported. For this purpose there are provided corner posts 168 which extend upwardly from the platform to form a supporting structure for a scrap supporting unit 170 including a plurality of compartments or bins 170a, 170b, 170c and 170d. As illustrated, these scrap bins or compartments are supported as an integral unit. The scrap supporting unit 170 is rotatably supported relative to the platform 166 in order that any selected bin 170a, 170b, 170c or 170d can be positioned adjacent the charging doors of the furnace 12. The bins 170 are provided with open tops so that scrap metal of the desired types and amounts can be loaded therein.

In order that the furnace 12 may be charged with scrap from the bins 170, the latter are provided with removable bottoms whereby the contents of a bin can be emptied when desired. Beneath the bins 170 above the platform 166 there is provided a charging chute 176 having a rounded bottom. The charging chute 176 is disposed in a fixed position beneath the bins 170 and each specific bin such as 170a, 170b, 170c and 170d may be rotated to a position to discharge its contents through the bottom thereof into chute 176. The latter is dimensioned to receive the contents of a single bin positioned above it and is positioned to discharge these contents toward the furnace 12. In order to carry the scrap metal into the furnace through the opening 70 normally closed by door 74, the chute 176 is provided with a slidable extension chute 178. This extension, when extended, guides the material from the chute 176 directly into the furnace, as shown in FIGURE 10. Moreover, this extension 178 is retractable to the position shown in dotted lines in FIGURE 11 so that the discharge end of the entension chute clears the furnace structure whereby the charging apparatus 160 can be moved along the rails 14 without interference.

In operation, each of the bins 170a, 170b, 170c and 170d is loaded with the proper types and amounts of scrap metal for a charge by any suitable means. The charging apparatus 160 is then positioed adjacent the furnace 12 and the charging door 74 adjacent the receptacle 18 or 20 is opened. The chute extension 178 is then extended into the furnace opening 70 and the bottom of the desired bin which has been rotated to be positioned directly above the chute 176 is opened allowing the charge in the bin to pass through the chute 176 and extension 178 into the furnace. The rate of charging is controlled by the amount the bottom of the bin is opened and as soon as the bin is empty, another bin is placed in position above the chute 176 for emptying. Thus, four different types of scrap metal for charging the furnace can be carried in the system and can be fed into the furnace by selectively rotating the bins 170 into position and opening the bottoms thereof to charge the furnace 12.

It will be understood that charging apparatus 160 requires considerable more head room than charging apparatus 13. It, too, however, may be provided with means to raise the height of the charging chute inlet to control the location of scrap deposit with respect to the area of the receptacle 18 or 20.

While there have been shown and described several embodiments of the present invention, it will be understood that changes and modifications are likely to occur to those skilled in the art and it is intended in the appended claims to cover all those changes and modifications which fall within the true spirit and scope of the present invention.

What is claimed as new and desired to be secured by Letters Patent of the United States is:

1. Apparatus for making steel comprising a furnace having a single chamber, said chamber having a pair of adjacent charge receiving receptacles lined with refractory material, said receptacles being large in volume relative to surface area when contrasted with a conventional open hearth whereby all of the metal contained within said receptacles may be successfully refined by blowing with oxygen lance means, a pair of cover members, one disposed over each of said receptacles and together forming a single unobstructed uncompartmented common combustion space, the cross sectional area of said combustion space between the two receptacles taken transversely of the length of the furnace being substantially equal to the cross sectional area of said combustion space at the transverse center lines of the receptacles, oxygen lance means movably mounted into each one of said cover members for alternately blowing the charge in each receptacle, and damper means for directing hot gases emitted from each receptacle during the blowing of the charge contained therein into intimate contact with the adjacent receptacle for preheating material disposed therein, the depth of said receptacles being sufficient to prevent excessive deterioration of said receptacles during the oxygen blowing operation.

2. Apparatus for making steel comprising a furnace having a single chamber, said chamber having a pair of adjacent charge receiving receptacles lined with refractory material, said receptacles being large in volume relative to surface area when contrasted with a conventional open hearth whereby all the metal contained within said receptacles may be successfully refined by blowing with oxygen lance means, cover means over said receptacles, and forming a single unobstructed uncompartmented space for combustion of gases emitted from one of the receptacles, said cover means defining a substantially unrestricted channel for gases moving between said receptacles, the cross sectional area of said channel being substantially constant from the center of one receptacles to the center of the other receptacle, means in said cover means for permitting a metal charge to be supplied to each of said receptacles, oxygen lance means movably mounted in said cover means for alternately blowing the charge in each one of said receptacles, and means for causing hot gases emitted from each receptacle during the blowing of the charge contained therein to pass by the material in the adjacent receptacle for preheating said material, the depth of said receptacles being sufficient to prevent excessive deterioration of said receptacles during the oxygen blowing operation.

3. The apparatus of claim 2 wherein said last mentioned means comprises means for discharging a gas in a predetermined direction relative to said receptacles.

4. The apparatus of claim 3 wherein said means for discharging a gas comprises air lance means disposed at an angle to cause hot gases from said one receptacle to move toward the adjacent receptacle.

5. In a device for refining steel, the combination of a furnace having a single chamber, said chamber having a pair of adjacent charge receiving receptacles lined with refractory material, said receptacles being large in volume relative to surface area when contrasted with a conventional open hearth whereby all the metal contained within said receptacles may be successfully refined by blowing with oxygen lance means, a pair of removable cover members, one disposed over each of said receptacles, said cover members forming an enclosure over said receptacles, the cross sectional area of the enclosure between the two receptacles taken transversely of the length of the furnace being substantially equal to the cross sectional area of the enclosure at the transverse center lines of the receptacles, said cover members being lined with a refractory material, oxygen lance means movably mounted in each of said cover members for alternately blowing a molten charge in said receptacles, and lance means for directing hot gases emitted from the particular receptacle during the blowing of the molten charge contained therein into intimate contact with the adjacent receptacle for preheating material disposed therein, the depth of said receptacles being sufficient to prevent excessive deterioration of said receptacles during the oxygen blowing operation.

6. Apparatus for making steel comprising a furnace having a single chamber, said chamber having a pair of adjacent charge receiving receptacles lined with refractory material, said receptacles being of greater depth and lesser longitudinal extent than a conventional open hearth whereby all of the metal contained in said receptacles is retained in close proximity to and may be refined by blowing with oxygen lance means, said furnace including roof means disposed above said receptacles and defining with side walls of said furnace a single uncompartmented unobstructed space above said receptacles for combustion of gases emitted from said receptacles, the cross sectional area of said space between the two receptacles taken transversely of the length of the furnace being at least as great as the cross sectional area of the enclosure at the transverse center lines of the receptacles, oxygen lance means mounted in said roof means for alternately blowing the charge in each of said receptacles, the depth of said receptacles being sufficient to prevent excessive deterioration of said receptacles during the oxygen blowing operation, and means for directing hot gases emitted from the particular receptacle during the blowing operation of the molten charge contained therein into intimate contact with the adjacent receptacle for preheating a cold charge of scrap disposed therein.

7. Apparatus for making steel comprising a furnace having a single chamber, said chamber having a pair of adjacent charge receiving receptacles lined with refractory material, said receptacles being large in volume relative to surface area when contrasted with a conventional open hearth whereby all the metal contained within said receptacles may be successfully refined by blowing with oxygen lance means, cover means over said receptacles forming an enclosure, the cross sectional area of the enclosure between the two receptacles taken transversely of the length of the furnace being substantially as great as the cross sectional area of the enclosure at the transverse center lines of the receptacles, oxygen lance means mounted in said cover means for alternately blowing the charge in each of said receptacles, and means operable to obstruct flow of hot gases emitted from each receptacle during the blowing operation and for causing said hot gases to pass over material contained in the adjacent receptacle, the depth of said receptacles being sufficient to prevent excessive deterioration of said receptacles during the oxygen blowing operation.

8. Apparatus for making steel from hot metal and scrap comprising a furnace having a single chamber, said chamber having a pair of adjacent charge receiving receptacles therewithin, said receptacles being large in volume relative to surface area when contrasted with a conventional open hearth whereby all of the metal contained within said receptacles may be successfully refined by blowing with oxygen lance means, a roof and wall structure over said receptacles, said roof and wall structure defining a substantially unrestricted channel for gases moving between said receptacles, the cross sectional area of said channel being at least as great in the center of the furnace as at the center of said receptacles, means in said structure for permitting a charge of cold scrap to be supplied to each receptacle, means for permitting hot metal to be supplied to each receptacle, means movable along said furnace for rapidly charging either of said receptacles with cold scrap, means for charging either of said receptacles with hot metal, oxygen lance means mounted relative to said roof and wall structure for alternately blowing the charge in each of said receptacles, and additional means supported by the roof and wall structure for directing hot gases emitted from each of said receptacles during the blowing of the molten charge contained therein into intimate contact with scrap material in the adjacent receptacle, the depth of said receptacles being sufficient to prevent excessive deterioration of said receptacles during the oxygen blowing operation.

9. The apparatus of claim 8 wherein said means movable along said furnace comprises a pair of tiltable scrap bins including outlet means, and wherein means are provided selectively to tilt one of said scrap bins rapidly to discharge the scrap contained therein through said outlet means and said first means.

10. The apparatus of claim 9 wherein means are provided to control the elevation of the outlet of said tiltable scrap bins whereby the charge may be deposited at particular locations within said receptacle.

11. Apparatus for making steel from a molten charge of pig iron and scrap comprising a single unobstructed uncompartmented furnace having a pair of adjacent charge receiving receptacles within said single furnace lined with refractory material, said receptacles being large in volume relative to surface area when contrasted with a conventional open hearth whereby all of the metal contained within said receptacles may be successfully refined by blowing with oxygen lance means, the cross sectional area of said furnace between the two receptacles taken transversely of the length of the furnace being at least as great as the cross sectional area of said furnace at the transverse center lines of the receptacles, means for supplying said molten charge to each receptacle comprising a charging chute for each receptacle arranged to cause the molten metal to enter the associated receptacle tangentially, oxygen lance means for alternately blowing the charge in each receptacle, and means for directing hot gases emitted from one receptacle during its blowing operation into intimate contact with the charge in the other receptacle, the depth of said receptacles being sufficient to prevent excessive deterioration of said receptacles during the oxygen blowing operation.

12. Apparatus for refining steel comprising a single unobstructed uncompartmented furnace having two receptacles therein in juxtaposition, said receptacles being large in volume relative to surface area when contrasted with a conventional open hearth whereby all the metal contained within said receptacles may be successfully refined by blowing with oxygen lance means, access door means adjacent each receptacle and extending along substantially the entire length of the receptacle and operable to give access to the receptacle for fast charging, gas outlet means at opposite ends of said furnace for escape from the furnace of gases generated in refining, means operable to obstruct flow through one or the other of said outlet means whereby gases generated in refining in one of the receptacles is caused to pass from the furnace through the more distant outlet means, the cross sectional area of said furnace between the two receptacles taken transversely of the length of the furnace being at least as great as the cross-sectional area of said furnace at the transverse center lines of the receptacles, oxygen lance means mounted relative to said furnace for alternately blowing the charge in each of said receptacles, the depth of said receptacles being sufficient to prevent excessive deterioration of said receptacles during the oxygen blowing operation.

13. Apparatus for refining steel as claimed in claim 12 in which charging means is provided adjacent said access door means and which has sufficient capacity to charge the receptacle in relatively short time.

14. Apparatus for making steel from a molten charge of pig iron and scrap comprising a furnace having a charge receiving receptacle lined with refractory material, said receptacle having a depth in excess of four feet, an enclosure for said receptacle lined with refractory material, oxygen lance means extending through said enclosure with the end thereof disposed above said receptacle for blowing said molten charge, and a molten metal charging chute leading from an opening in said enclosure to the periphery of said receptacle whereby molten metal supplied through said charging chute enters said receptacle tangentially.

15. The apparatus of claim 14 wherein said enclosure is removable from said furnace whereby it may readily be interchanged with another similar enclosure and it is unnecessary to shut said furnace down when repair of the enclosure is necessitated.

16. The apparatus of claim 14 wherein gas directing lance means in addition to said oxygen lance means extend through said enclosure.

17. Apparatus for making steel comprising a single open hearth furnace hearth supporting structure, substantially continuous hearth means carried by said supporting structure and having a pair of closely spaced charge receiving receptacles, a refractory lined cover comprising roof and side walls over said receptacles and forming with said hearth means a single unobstructed common combustion space in said furnace, the cross sectional area of said combustion space between the two receptacles taken transversely of the length of the furnace being substantially as great as the cross sectional area of said combustion space at the transverse center lines of the receptacles, said receptacles being large in volume relative to surface area when contrasted with a conventional open hearth whereby all of the metal contained within said receptacles may be successfully refined by blowing with oxygen lance means, means in said cover for permitting a charge of cold scrap to be supplied to each receptacle and for permitting hot metal to be supplied to each receptacle, means for rapidly charging either of said receptacles with cold scrap, means for charging either of said receptacles with hot metal, and oxygen lance means mounted adjacent said enclosure for alternately blowing the charge in each of said receptacles, and means for causing hot gases emitted from each receptacle during the blowing of the charge contained therein to pass by the material in the adjacent receptacle for preheating said material, the depth of said receptacles being sufficient to prevent excessive deterioration of said receptacles during the oxygen blowing operation.

18. Charging apparatus for rapidly charging with cold scrap iron comprising a furnace having a scrap charging opening therein, supporting means, means for moving said supporting means relative to said furnace, two scrap boxes carried by said supporting means, each of said scrap boxes having an open end and a closed end, a discharge chute mounted to receive scrap from said scrap boxes and convey the same to said furnace, means for bodily raising said scrap boxes to position said boxes at selected variable elevations, means for pivotally supporting each of said scrap boxes at the open ends thereof, means for raising the closed end of either of said scrap boxes to selectively tilt either of said scrap boxes to discharge the contents into said discharge chute, said discharge chute being disposed to receive scrap from either scrap box.

19. The charging apparatus of claim 18 wherein a gate pivotally mounted at the open ends of said scrap boxes is provided.

20. Apparatus for making steel comprising hearth supporting structure for a single open hearth furnace, substantially continuous hearth means carried by said supporting structure and having a pair of closely spaced charge receiving receptacles, said receptacles being large in volume relative to surface area when contrasted with a conventional open hearth whereby all the metal contained within said receptacles may be successfully refined by blowing with oxygen lance means, refractory lined cover means over said receptacles and forming with said hearth means a single unobstructed common combustion space in said furnace, the cross sectional area of said combustion space between the two receptacles taken transversely of the length of the furnace is substantially equal to the cross sectional area of said combustion space at the transverse center lines of the receptacles, means in said cover means for alternately permitting a charge of cold scrap to be supplied to each receptacle, means in said cover means for permitting a charge of hot metal to be supplied to said receptacles, means for rapidly charging either of said receptacles with cold scrap, means for charging either of said receptacles with hot metal, oxygen lance means mounted relative to said cover means for alternately blowing the charge in each of said receptacles, and means for directing hot gases emitted from each of said receptacles during the blowing operation of the charge contained therein into intimate contact with the adjacent receptacle for preheating said cold charge disposed therein, the depth of said receptacles being sufficient to prevent execssive deterioration of said receptacles during the oxygen blowing operation.

21. Apparatus for making steel comprising a furnace having a pair of adjacent charge receiving receptacles, an enclosure disposed over said receptacles, a pair of charging openings disposed in spaced relationship in said enclosure for charging the associated one of said receptacles with scrap iron, charging apparatus for rapidly charging either of said receptacles through its associated charging opening, supporting means for said charging apparatus, means for moving said supporting means relative to said furnace to charge through either charging opening, a scrap box having an open end and a closed end, a discharge chute including a portion moveable relative to said charging openings, said discharge chute being mounted to receive scrap from the open end of said scrap box and convey the same through one of said charging openings, means for bodily raising said scrap box to position said open end at variable elevations relative to said receptacles, means for pivotally supporting said scrap box at the open end thereof, and means for raising the closed end of said scrap box to discharge the contents into said discharge chute.

References Cited
UNITED STATES PATENTS

| | | | |
|---|---|---|---|
| 714,449 | 11/1902 | Carson | 266—35 |
| 1,707,937 | 4/1929 | Gerlach | 13—33 |
| 2,155,418 | 4/1939 | Griggs et al. | 266—33 |
| 2,672,247 | 3/1954 | Jewett. | |
| 2,940,620 | 6/1960 | Haas | 13—33 |
| 2,965,370 | 12/1960 | Kesterton et al. | 266—34 |
| 3,060,014 | 10/1962 | Aihara | 75—43 |
| 3,062,524 | 11/1962 | Leroy et al. | 266—34 |
| 3,107,797 | 10/1963 | McFeaters et al. | 298—11 |

OTHER REFERENCES

Iron and Steel Engineer, 1965, p. 218.

JOHN F. CAMPBELL, *Primary Examiner.*

BENJAMIN HENKIN, *Examiner.*

M. L. FAIGUS, *Assistant Examiner.*